3,080,410
PREPARATION OF THE FERRIC CHELATE OF HYDROXYETHYLIMINODIACETIC ACID

Robert Bruce Le Blanc, Lake Jackson, Tex., assignor to The Dow Chemical Company, Midland, Mich., a corporation of Delaware
No Drawing. Filed May 31, 1960, Ser. No. 32,548
3 Claims. (Cl. 260—439)

This invention relates to a process for preparing the iron chelate of hydroxyethyliminodiacetic acid wherein the iron chelate carries the iron in the trivalent, ferric, form.

The usefulness of iron chelates of certain synthetic polyamino polycarboxylic acid compounds in plant culture has been rather fully annotated. In fact, it may be said that iron chelates in this form are accepted soil adjuvants and improvements in the technology of their use and manufacture reside in improving the effectiveness of the particular product it is desired to prepare. Commonly, the solid iron chelates of ethylenediamine acetic acid compounds, as sold in commerce, consist essentially of a mixture of the ferric and ferrous compounds accompanied by about 30 percent by weight of sodium sulfate, the entire composition containing only about 9 percent of chelated iron.

It is, accordingly, a fundamental object of this invention to provide a method for the preparation of the iron chelate of hydroxyethyliminodiacetic acid, wherein the iron will be found entirely in the ferric form.

It is another object of the invention to provide a method for the preparation of the iron chelate wherein the amount of salt contaminants are reduced to a minimum.

Other objects and advantages of the invention will in part be obvious and in part appear hereinafter.

The invention, accordingly, is embodied in a process for preparing a pure form of ferric chelate of hydroxyethyliminodiacetic acid by means of reaction of a ferric salt, selected from the group consisting of ferric sulfate and ferric chloride, dissolved in water and 2 percent to 5 percent excess hydroxyethyliminodiacetic acid, whereupon the pH is adjusted to a range from 2 to about 5, with the addition of solid sodium carbonate, said reacting mixture being stirred at all times at slightly elevated temperature without allowing the solution to cool below 28–30° C. The iron chelate precipitate is formed, filtered out, washed with cold water, and dried, with an iron chelate containing about 22.6 percent iron resulting. It is to be understood, therefore, that the theory of the operation is to carry out the reaction between the ferric salt and hydroxyethyliminodiacetic acid in the presence of sodium carbonate or caustic, at a controlled temperature, when necessary, to prevent crystalline sodium sulfate being formed to contaminate the iron chelate precipitate.

In general, in the past, the methods of producing iron chelates of certain alkylene amino acid compounds either yielded a product consisting essentially of ferrous chelate with greater amounts of sodium sulfate than the chelated iron; or else it is necessary to form crystalline sodium sulfate to remove the contaminant from the iron chelate it is desired to prepare.

The process which characterizes this invention provides a much greater ferric chelate yield and a more direct method for obtaining the desired iron chelate by controlling conditions such that the iron chelate is precipitated directly from the reacting mixture with minimum amounts of contaminant. I have found that by reacting an excess of hydroxyethyliminodiacetic acid with ferric salts, being namely ferric sulfate and ferric chloride, in the presence of sodium carbonate or caustic, controlling the pH, and the temperature of separation in the case of ferric sulfate, that a product can be obtained which contains about 22.6 percent chelated iron, a substantial increase in iron content with only a trace of $SO_4^=$ or $Cl^-$. In general, therefore, the process consists of slowly adding hydroxyethyliminodiacetic acid to a ferric salt solution, to the desired level of excess, preferably about 3 percent, with stirring, adjusting the pH from 2–5, with a pH of 3–4 being preferred, by the addition of solid sodium carbonate or caustic, the stirring being continued and the entire process being carried out at slightly elevated temperature with care not to let the temperature drop below 28–30° C. when ferric sulfate is used as a reactant. The process thus takes advantage of the fact that the ferric chelate of hydroxyethyliminodiacetic acid passes through a minimum solubility level in the pH range 3–4. The green ferric chelate precipitate is filtered out, washed with cold water and dried with the ferric chelate containing about 22.6 percent chelated iron.

The process may be better understood by reference to the following specific examples which outline the details of the process:

EXAMPLE I 251 grams of 79.8 percent $Fe_2(SO_4)_3$ was dissolved in a small amount of water. To the iron solution 387 grams of 58.8 percent hydroxyethyliminodiacetic acid, aqueous solution, was added slowly, with stirring, at ambient temperature. At this stage, the pH was very low, less than 2. Solid sodium carbonate was added slowly while the mixture was being stirred to raise the pH to 3–4. The green precipitate of iron chelate of hydroxyethyliminodiacetic acid was filtered out in a Buechner funnel with suction. Cold water was used to wash the precipitated chelate. The chelate was dried overnight in an oven at 105° C. The percent chelated iron and the percent sulfate were each determined polarographically. Similar comparative tests are shown by the following table:

*Comparative Tests.—Process for Example I—Preparation of Ferric-Hydroxyethyliminodiacetic Acid (HEIDA) Chelate*

| Test No. | 11 | 12 | 13 |
|---|---|---|---|
| Weight 58.8% HEIDA _____ gm__ | 387 | 414 | 387 |
| Weight 79.8% $Fe_2(SO_4)_3$ _____ gm__ | 251 | 251 | 251 |
| pH Filtrate_____ | 4.04 | 3.1 | 3.55 |
| Weight Filtrate _____ gm__ | 1,188 | 1,166 | 1,014 |
| Percent Fe Filtrate_____ | 0.31 | 0.31 | 0.28 |
| Weight Ppt _____ gm__ | 230 | 238 | 238 |
| Percent Fe Ppt_____ | 22.4 | 22.2 | 22.4 |
| Weight Fe Filtrate and Ppt_____ | 55.4 | 56.4 | 56.1 |
| Percent Yield Ppt_____ | 92.2 | 94.4 | 95.4 |
| Percent $SO_4^=$ Ppt_____ | 0.8 | 0.4 | 0.1 |

The amount of chelate remaining in the filtrate is higher than what is indicated by the solubility of the chelate in water. This higher solubility could be due to two things, namely, the high ionic strength of the filtrate and a tendency towards supersaturation by the chelate.

In the process caustic could be used for adjusting the pH to 3–4 instead of sodium carbonate. This would eliminate the frothing of the mixture due to the liberation of carbon dioxide. But, in such case, the caustic should be rather dilute, 10 percent, and added slowly with thorough agitation to prevent localized high pH, which would precipitate ferric oxide which might not subsequently re-dissolve. Slightly elevated temperature is desirable since there is a danger of sodium sulfate precipitating and contaminating the chelate should the temperature go below 28–30° C.

The process is quite specific in requiring an excess of hydroxyethyliminodiacetic acid for several reasons. Namely, if a slight excess of iron were to be used, a fine precipitate of ferric oxide would result which would make filtering difficult and would contaminate the chelate. Also, hydroxyethyliminodiacetic acid, as commercially prepared, contains some chelating impurities in the form of closely related compounds and, to obtain the highest yields, sufficient hydroxyethyliminodiacetic acid (exclusive of the chelating impurities) must be added to chelate all the iron with hydroxyethyliminodiacetic acid. I have found that about 3 percent molar excess of hydroxyethyliminodiacetic acid will give maximum yield.

EXAMPLE II

One mol (270 grams) of $FeCl_3 \cdot 6H_2O$ was dissolved in a small amount of water. To the iron solution 387 grams of 58.8 percent hydroxyethyliminodiacetic acid, aqueous solution, was added slowly, with stirring, at ambient temperature. Solid sodium carbonate was added slowly while the mixture was being stirred to raise the pH to 3-4. The green precipitate was filtered out in a Buechner funnel with suction. Cold water was used to wash the precipitate. The chelate was dried overnight in an oven at 105° C. The percent chelated iron was determined polarographically and the percent chloride was determined by pCl measurement. Similar comparative tests are shown by the following table:

*Comparative Tests.—Process Per Example II— Preparation of Ferric-HEIDA Chelate*

| Test No. | | 14 | 16 |
|---|---|---|---|
| Weight 58.8% HEIDA | gm | 387 | 500 |
| Weight FeCl₃6.H₂O | gm | 270 | 270 |
| pH Filtrate | | 3.5 | 3.5 |
| Weight Filtrate | gm | 1,017 | 1,115 |
| Percent Fe Filtrate | | 0.32 | 0.45 |
| Weight Ppt | gm | 234 | 223 |
| Percent Fe Ppt | | 22.4 | 22.6 |
| Weight Fe Filtrate and Ppt | | 55.8 | 55.4 |
| Percent Yield Ppt | | 93.8 | 90.1 |
| Percent Cl⁻ Ppt | | 0.15 | -------- |

Again, the amount of chelate remaining in the filtrate is higher than the solubility of the chelate in water.

In the process where iron chloride is used, the reaction is independent of temperature. Caustic solution may again be used in place of solid sodium carbonate for adjusting the pH to 3-4.

In summary, the process of this invention consists of conducting the reaction between a ferric salt, such as, ferric sulfate or ferric chloride, and an excess of hydroxyethyliminodiacetic acid over the iron, with about a 3 percent excess being preferred, where the pH is adjusted to a range from about 2 to 5 with the preferred range from 3-4, and at slightly elevated temperature, not allowing the temperature to go below 28-30° C.

In general, it will be found that operations in accordance with the invention will make it possible to obtain a yield of better than 90 percent of the theoretical amount of ferric—hydroxyethyliminodiacetic acid chelate, with the product purity of about 99 percent. At least 20 percent and more likely approximately 22.6 percent chelated iron will be contained in the product, with less than 1 percent of $SO_4^=$ or $Cl^-$.

This iron chelate has wide application as an additive to iron-deficient soils even under basic soil conditions, since I have found that it does not precipitate iron at a pH of 10 after a week's standing. Thus it keeps the iron in soluble form in the soil over a long period of time and is very useful in alkaline soils. Also, it has a commercial advantage in that the chelate has about 22.6 percent chelated iron and is prepared from one of the less expensive chelating agents.

What is claimed is:

1. The method of preparing an iron chelate of hydroxyethyliminodiacetic acid, which comprises forming a solution of an iron salt, adding thereto a slight excess of solution of hydroxyethylimino diacetic acid, whereby the pH of said mixture is less than 2, thereafter adding sodium carbonate slowly to raise the pH of the mixture to a level of 3-4, thereby to induce precipitation of the iron chelate of hydroxyethyl iminodiacetic acid in substantially pure form, and recovering the iron chelate of hydroxyethyliminodiacetic therefrom.

2. The method in accordance with claim 1, in which excess hydroxyethyliminodiacetic acid is reacted with ferric sulfate.

3. The method in accordance with claim 1, in which excess hydroxyethyliminodiacetic acid is reacted with ferric chloride.

References Cited in the file of this patent

UNITED STATES PATENTS 2,936,316      Young ---------------- May 10, 1960

OTHER REFERENCES

Chaberek et al.: Jour. of American Chemical Society, vol. 76, pp. 215–218, (1954).

Chaberek et al.: Ibid. vol. 74, (1952), pp. 5057–5060.

Chaberek et al.: Organic Sequestering Agents, (1959), pp. 558–559.